US009873346B2

United States Patent
Maekawa (10) Patent No.: US 9,873,346 B2
(45) Date of Patent: Jan. 23, 2018

(54) DEVICE AND METHOD OF ADJUSTING RELATIVE POSITION BETWEEN POWER-SUPPLYING COIL AND POWER-RECEIVING COIL

(71) Applicant: IHI Corporation, Tokyo (JP)

(72) Inventor: Yuji Maekawa, Tokyo (JP)

(73) Assignee: IHI CORPORATION, Tokyo (JP)

( * ) Notice: Subject to any disclaimer, the term of this patent is extended or adjusted under 35 U.S.C. 154(b) by 322 days.

(21) Appl. No.: 14/659,840

(22) Filed: Mar. 17, 2015

(65) Prior Publication Data

US 2015/0191094 A1 Jul. 9, 2015

Related U.S. Application Data (63) Continuation of application No. PCT/JP2013/072693, filed on Aug. 26, 2013.

(30) Foreign Application Priority Data

Oct. 3, 2012 (JP) .................................. 2012-221123

(51) Int. Cl.
| | |
|---|---|
| *B60L 11/18* | (2006.01) |
| *H02J 50/80* | (2016.01) |
| *H02J 50/90* | (2016.01) |
| *H02J 50/10* | (2016.01) |
| *B60L 11/14* | (2006.01) |

(Continued)

(52) U.S. Cl.
CPC .......... *B60L 11/1829* (2013.01); *B60L 11/14* (2013.01); *B60L 11/182* (2013.01);
(Continued)

(58) Field of Classification Search
USPC ....................................................... 307/104
See application file for complete search history.

(56) References Cited

U.S. PATENT DOCUMENTS

| | | | | |
|---|---|---|---|---|
| 5,821,731 A | * | 10/1998 | Kuki | ................... B60L 11/1805 320/108 |
| 8,917,056 B2 | * | 12/2014 | Jung | ....................... H02J 5/005 180/65.21 |

(Continued)

FOREIGN PATENT DOCUMENTS

| | | |
|---|---|---|
| CN | 102480158 A | 5/2012 |
| JP | 9-213378 A | 8/1997 |

(Continued)

OTHER PUBLICATIONS

International Search Report, PCT/JP2013/072693, dated Nov. 26, 2013, 2 pgs.

*Primary Examiner* — An Luu
(74) *Attorney, Agent, or Firm* — Volpe and Koenig, P.C.

(57) ABSTRACT

A power-supplying coil and a wheel stopper are installed in a stop area, and distance data showing a distance in front-back direction between a power-receiving coil and a wheel of an electric vehicle is received by a receiver. Based on the distance data, as a controller controls a drive device, the wheel stopper or the power-supplying coil is moved and a distance in an approach direction between the power-supplying coil and the wheel stopper shown by distance data is made equal to the distance in the front-back direction. Accordingly, in a state in which the wheel of the electric vehicle which has entered the stop area touches the wheel stopper and stops, a position of the power-receiving coil coincides with a position of the power-supplying coil in the approach direction.

8 Claims, 8 Drawing Sheets

(51) Int. Cl.
*H02J 5/00* (2016.01)
*B60M 7/00* (2006.01)
*H02J 7/02* (2016.01)

(52) U.S. Cl.
CPC .......... *B60L 11/1833* (2013.01); *H02J 5/005* (2013.01); *H02J 50/10* (2016.02); *H02J 50/80* (2016.02); *H02J 50/90* (2016.02); *B60M 7/003* (2013.01); *H02J 7/025* (2013.01); *Y02T 10/70* (2013.01); *Y02T 10/7005* (2013.01); *Y02T 10/7072* (2013.01); *Y02T 10/7077* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 9,287,720 B2* | 3/2016 | Kawamura | B60L 11/182 |
| 9,477,893 B2* | 10/2016 | Findeisen | G06K 9/00791 |
| 2016/0303991 A1* | 10/2016 | Chang | B60L 11/1848 |

FOREIGN PATENT DOCUMENTS

| | | | | |
|---|---|---|---|---|
| JP | 2006-217690 A | 8/2006 | | |
| JP | 2008-288889 A | 11/2008 | | |
| JP | 2010-246348 A | 10/2010 | | |
| JP | 2011-097814 A | 5/2011 | | |
| JP | 2011-217452 A | 10/2011 | | |
| JP | 2014091934 A | * 5/2014 | ............ | B60L 11/18 |

* cited by examiner

DEVICE AND METHOD OF ADJUSTING RELATIVE POSITION BETWEEN POWER-SUPPLYING COIL AND POWER-RECEIVING COIL

This application is a continuation application based on a PCT Patent Application No. PCT/JP2013/072693, filed Aug. 26, 2013, whose priority is claimed on Japanese Patent Application No. 2012-221123, filed Oct. 3, 2012. The contents of both the PCT application and the Japanese Patent Application are incorporated herein by reference.

TECHNICAL FIELD

The present invention relates to a device and a method of adjusting a relative position between a power-supplying coil and a power-receiving coil of an electric vehicle when the electric vehicle has entered and stopped in a stop area for wireless supply of electric power from the power-supplying coil to the power-receiving coil.

BACKGROUND ART

A method of supplying electric power to a power-receiving coil of an electric vehicle is disclosed in Patent Document 1 described below. In Patent Document 1, the power-receiving coil is provided at a lower surface of the electric vehicle, and a power-supplying coil is provided in a stop area of the electric vehicle. A position of the power-receiving coil is aligned with a position of the power-supplying coil so that the power-receiving coil and the power-supplying coil are opposite to each other by positioning of the electric vehicle. In this state, alternating-current electric power is supplied to the power-supplying coil. Accordingly, electric power is wirelessly supplied from the power-supplying coil to the power-receiving coil. The power supplied to the power-receiving coil is stored in a battery provided in the electric vehicle.

As described above, in order to supply the supply electric power from the power-supplying coil provided in the stop area to the power-receiving coil provided on the electric vehicle, the position of the power-supplying coil should be aligned with the position of the power-receiving coil.

For this reason, in Patent Document 1, a transmission coil for communication is installed in an internal space of the power-receiving coil, and a reception coil for communication is installed in an internal space of the power-supplying coil. When the position of transmission coil is aligned with the position of the reception coil, the position of the power-receiving coil is aligned with the position of the power-supplying coil.

According to the above-mentioned configuration, in Patent Document 1, as described below, the position of the power-receiving coil is aligned with the position of the power-supplying coil. An electromagnetic wave from a transmission coil is received in a reception coil while the position of the electric vehicle is varied by driving the electric vehicle. When level of the electromagnetic wave received in the reception coil exceeds a threshold value, the electric vehicle is stopped. In this state, the position of the power-receiving coil is aligned with the position of the power-supplying coil.

DOCUMENT OF RELATED ART

Patent Documents

[Patent Document 1] Japanese Unexamined Patent Application, First Publication No. 2008-2888889

SUMMARY OF INVENTION

Technical Problem

However, in positioning the above-mentioned power-receiving coil and power-supplying coil, there are the following problems (1) and (2).

(1) In order to increase the sensitivity of the electromagnetic wave received in the reception coil to be larger than the threshold value, in adjusting the position of the electric vehicle, a driving technique of the electric vehicle is needed.

(2) Alignment of the position of the power-receiving coil with the position of the power-supplying coil may be time-consuming.

The present invention is directed to solve the above-described problems (1) and (2). That is, the present invention is directed to provide a device and method capable of easily making a position of a power-receiving coil of an electric vehicle aligned with a position of a power-supplying coil within a short period of time.

Solution to Problem

In order to achieve the above-mentioned objects, according to a first aspect of the present invention, there is provided an adjusting device for adjusting a relative position between a power-supplying coil and a power-receiving coil of an electric vehicle when the electric vehicle has entered and stopped in a stop area for wireless supply of electric power from the power-supplying coil to the power-receiving coil, wherein, the power-supplying coil and a wheel stopper are provided in the stop area, a wheel of the electric vehicle which has entered the stop area touches the wheel stopper, and the power-supplying coil wirelessly supplies power to the power-receiving coil of the electric vehicle stopping as the wheel touches the wheel stopper, the adjusting device includes:

a receiver configured to receive, from the electric vehicle, distance data showing a distance between the power-receiving coil and the wheel in front-back direction of the electric vehicle;

a drive device configured to move the wheel stopper or the power-supplying coil in an approach direction of the electric vehicle to the stop area or in an opposite direction of the approach direction; and a controller configured to control the drive device, and the controller makes a distance in the approach direction between the power-supplying coil and the wheel stopper equal to the distance shown by the distance data by controlling the drive device based on the distance data received by the receiver.

In the first aspect of the present invention, it may be possible that the wheel stopper is provided on an upper surface of an endless belt, the electric vehicle is able to ride on the upper surface, and the drive device moves the wheel stopper in the front-back direction by rotating the endless belt.

In order to achieve the above-mentioned objects, according to a second aspect of the present invention, there is provided an adjusting device for adjusting a relative position between a power-supplying coil and a power-receiving coil of an electric vehicle when the electric vehicle has entered and stopped in a stop area for wireless supply of electric power from the power-supplying coil to the power-receiving coil, wherein, the power-supplying coil and a wheel stopper are provided in the stop area, a wheel of the electric vehicle which has entered the stop area touches the wheel stopper, and the power-supplying coil wirelessly supplies power to the power-receiving coil of the electric vehicle stopping as the wheel touches the wheel stopper, the adjusting device comprises a receiver, a drive device and a controller which are provided in the electric vehicle, the receiver receives distance data showing the distance between the power-supplying coil and the wheel stopper in an approach direction of the electric vehicle from a transmitter, and the transmitter is disposed in front of the stop area or in the stop area, the drive device moves the power-receiving coil of the electric vehicle in a front-back direction of the electric vehicle, and the controller makes a distance in the front-back direction between the power-receiving coil and the wheel equal to the distance shown by the distance data by controlling the drive device based on the distance data received by the receiver.

In the first or second aspect of the present invention, it may be possible that a pallet on which the electric vehicle is able to ride is provided in the stop area, and the wheel stopper and the power-supplying coil are provided on the pallet, and the pallet is moved between the stop area and a storage space.

In addition, according to a third aspect of the present invention, there is provided a method of adjusting a relative position between a power-supplying coil and a power-receiving coil of an electric vehicle when the electric vehicle has entered and stopped in a stop area for wireless supply of electric power, the method including:

(A) installing the power-supplying coil and a wheel stopper which a wheel of the electric vehicle touches in the stop area;

(B) receiving, from the electric vehicle entering the stop area, distance data showing a distance from the power-receiving coil to the wheel in a front-back direction of the electric vehicle; and (C) making a distance in an approach direction between the power-supplying coil and the wheel stopper equal to the distance shown by the distance data by moving the wheel stopper or the power-supplying coil in the approach direction of the electric vehicle to the stop area or in an opposite direction of the approach direction based on the distance data.

According to a fourth aspect of the present invention, there is provided a method of adjusting a relative position between a power-supplying coil and a power-receiving coil of an electric vehicle when the electric vehicle has entered and stopped in a stop area for wireless supply of electric power from the power-supplying coil to the power-receiving coil, the method including:

(A) installing the power-supplying coil, a wheel stopper which a wheel of the electric vehicle touches in the stop area, and a transmitter installed in front of the stop area or in the stop area;

(B) receiving distance data showing a distance between the power-supplying coil and the wheel stopper in an approach direction of the electric vehicle from the transmitter by a receiver of the electric vehicle; and (C) making a distance in a front-back direction between the power-receiving coil and the wheel equal to the distance shown by the distance data by moving the power-receiving coil in the front-back direction of the electric vehicle based on the distance data.

According to an exemplary embodiment of the third or fourth aspect of the present invention, after the step (C), the electric vehicle enters the stop area and the electric vehicle stops as the wheel touches the wheel stopper.

Effects of the Invention

According to the invention of the above-mentioned first or third aspect, as described below, the position of the power-receiving coil and the position of the power-supplying coil can be aligned as the wheels of the electric vehicle simply touch a wheel stopper and stop.

Distance data showing a distance in front-back direction between the power-receiving coil and the wheel of the electric vehicle are received by the receiver. Based on the distance data, as a controller controls the drive device, the distance in the approach direction between the power-supplying coil and the wheel stopper is made equal to the distance in the front-back direction shown by the distance data by moving the wheel stopper or the power-supplying coil. Accordingly, in a state in which the wheels of the electric vehicle which has entered the stop area touch the wheel stopper, the position of the power-receiving coil is aligned with the position of the power-supplying coil.

Accordingly, according to the present invention of the first or third aspect, as the wheels of the electric vehicle simply touch the wheel stopper to stop the electric vehicle, the position of the power-receiving coil is aligned with the position of the power-supplying coil. Accordingly, the position of the power-receiving coil and the position of the power-supplying coil can be easily aligned within a short period of time.

According to the present invention of the above-mentioned second or fourth aspect, as described below, as the wheels of the electric vehicle simply touch the wheel stopper and stop, the position of the power-receiving coil and the position of the power-supplying coil can be aligned.

The distance data showing the distance in the approach direction between the power-supplying coil and the wheel stopper in the stop area are received by the receiver. Based on the distance data, as the controller controls the drive device, the distance in the front-back direction between the power-receiving coil and the wheel is made equal to the distance in the approach direction shown by the distance data by moving the power-receiving coil. Accordingly, in a state in which the wheels of the electric vehicle which has entered the stop area touch the wheel stopper and stop, the position of the power-receiving coil is aligned with the position of the power-supplying coil.

Accordingly, as the wheels of the electric vehicle simply touch the wheel stopper to stop the electric vehicle, the position of the power-receiving coil is aligned with the position of the power-supplying coil. Accordingly, the position of the power-receiving coil and the position of the power-supplying coil can be easily aligned within a short period of time.

DESCRIPTION OF EMBODIMENTS

Exemplary embodiments of the present invention will be described based on the accompanying drawings. Further, the same elements throughout the drawings are designated by the same reference numerals, and redundant description thereof will be omitted.

First Embodiment

A device and method of adjusting a relative position between coils according to a first embodiment of the present invention will be described.

Figure 1:
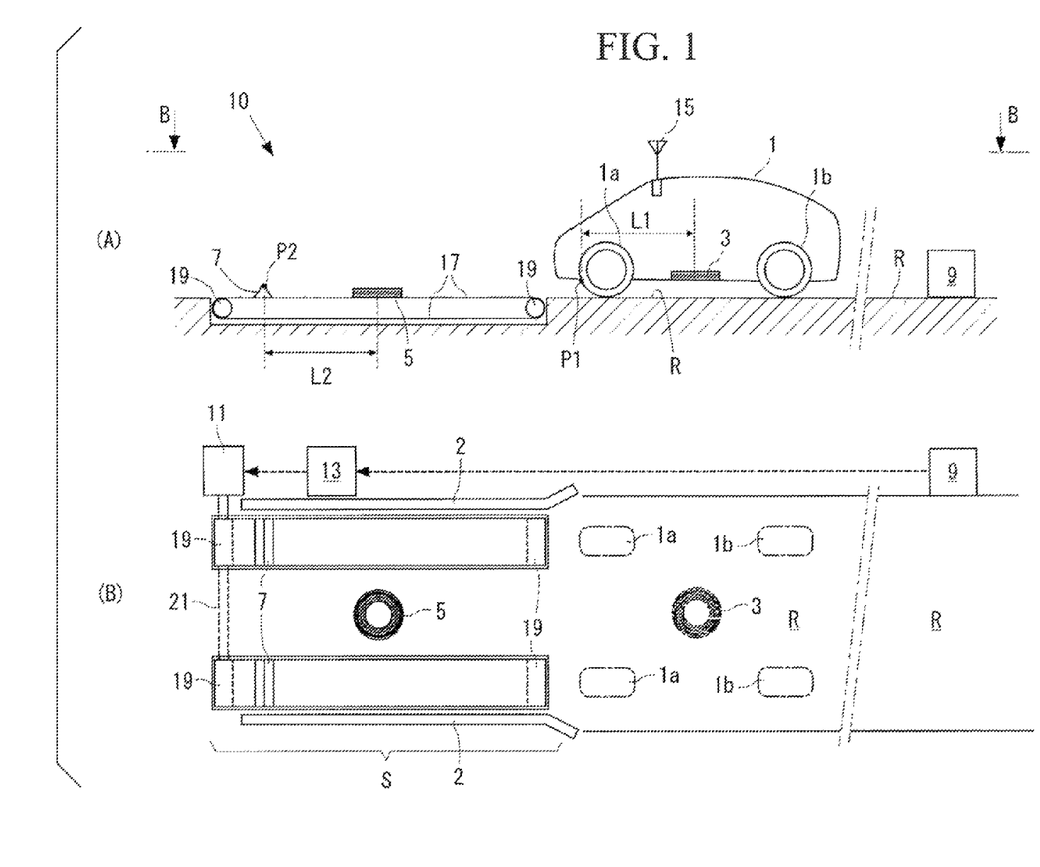
FIG. 1 shows a device for adjusting a relative position between coils according to a first embodiment of the present invention.
Figure 2:
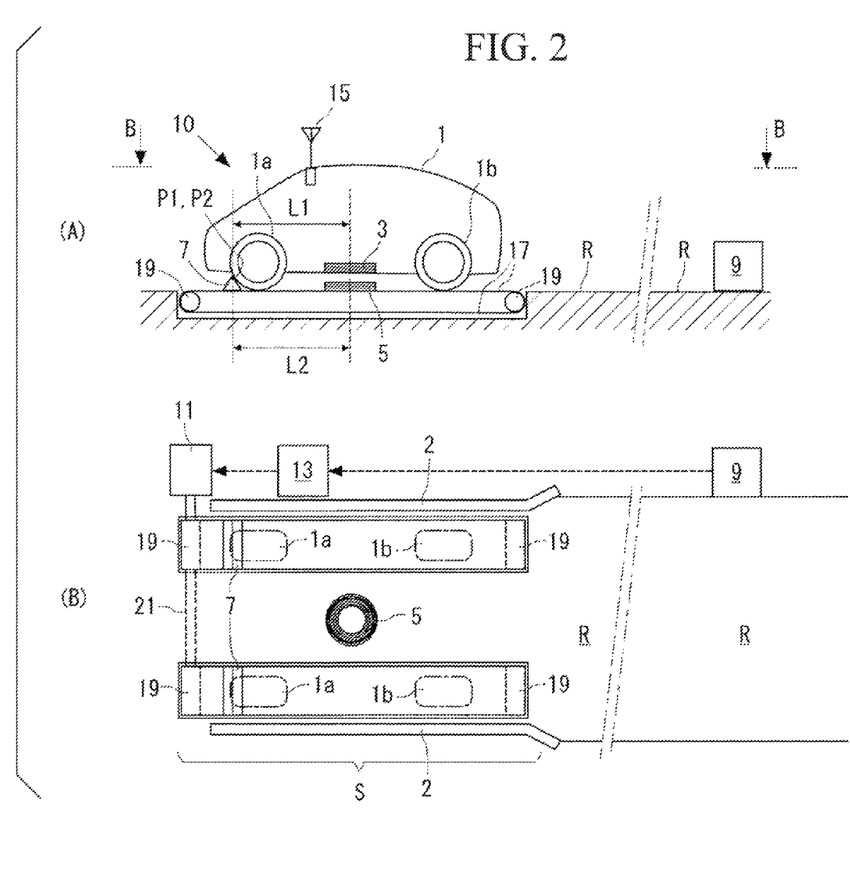
FIG. 2 shows a state in which an electric vehicle stops at a stop area.

FIGS. 1 and 2 show an adjusting device 10 for adjusting a relative position between coils according to the first embodiment of the present invention. FIG. 1 shows a state in which an electric vehicle 1 is disposed in an approach lane R approaching a stop area S. FIG. 2 shows a state in which the electric vehicle 1 stops in the stop area S.

FIG. 1(A) is a side view, and FIG. 1(B) is a view taken along line B-B of FIG. 1(A). In FIG. 1(B), of the electric vehicle 1, only wheels 1a and wheels 1b and a power-receiving coil 3 are shown by dashed-dotted lines. Further, among the wheels 1a and 1b of the electric vehicle 1, the wheel touching a wheel stopper 7 (to be described below) is designated by a reference numeral 1a.

FIG. 2(A) is a side view, and FIG. 2(B) is a view taken along line B-B of FIG. 2(A). In FIG. 2(B), of the electric vehicle 1, only the wheels 1a and 1b are shown by dashed-dotted lines.

In FIGS. 1(A) and 2(A), the inside of the electric vehicle 1 is shown.

The device 10 for adjusting the relative position between the coils adjusts a relative position between the power-receiving coil 3 and the power-supplying coil 5 when electric power is wirelessly supplied from the power-supplying coil 5 to the power-receiving coil 3 of the electric vehicle 1 which has entered into and stopped in the stop area S.

The power-supplying coil 5 and the wheel stopper 7 are provided in the stop area S. The wheel 1a of the electric vehicle 1 which has entered the stop area S touches the wheel stopper 7 in the front-back direction of the electric vehicle 1. The power-supplying coil 5 wirelessly supplies electric power to the power-receiving coil 3 of the electric vehicle 1 stopped as the wheel 1a touches the wheel stopper 7. Further, the power-receiving coil 3 is disposed near a lower surface of the electric vehicle 1, and an axis thereof is directed in a vertical direction. An axis of the power-supplying coil 5 is directed in the vertical direction.

Further, in FIGS. 1 and 2, a wheel guide 2 extending in the approach direction is provided in the stop area S. The wheel guide 2 is set to be lowered so as not to disturb a portion of the electric vehicle 1 except for the wheels 1a and 1b. The wheel guide 2 guides the wheels 1a and 1b of the electric vehicle 1 approaching the stop area S. Accordingly, in the stop area S, the position of the electric vehicle 1 can be disposed within an allowable range in a horizontal direction perpendicular to the approach direction.

Further, in this application, the approach direction is a direction determined by the stop area S, and denotes a direction in which the electric vehicle 1 approaches the stop area S. In addition, in this application, the front-back direction denotes forward and rearward direction of the electric vehicle 1.

In addition, in this application, the electric vehicle is provided with a power storage device for storing power supplied from the power-supplying coil 5 via the power-receiving coil 3, and may be a vehicle in which the power stored in the power storage device is used to drive the electric vehicle. For example, the electric vehicle is not limited to an electric vehicle in the narrow sense but may include a plug-in hybrid vehicle that uses an electrical motor together with a combustion engine to drive the vehicle.

The device 10 for adjusting the relative position between the coils is provided with a receiver 9, a drive device 11 and a controller 13.

The receiver 9 receives distance data showing a distance L1 in the front-back direction (see FIGS. 1(A) and 2(A)) between the power-receiving coil 3 and the wheel 1a in the electric vehicle 1. Here, the distance L1 in the front-back direction denotes a distance in the forward and rearward direction of the electric vehicle 1.

In the stop area S, when the electric vehicle 1 is determined to advance and approach the stop area S, the distance data shows the distance L1 in the front-back direction between the front wheel 1a and the power-receiving coil 3 of the electric vehicle 1.

Meanwhile, in the stop area S, when the electric vehicle 1 is determined to move rearward and approach the stop area S, the distance data show the distance L1 in the front-back direction between the rear wheel 1b and the power-receiving coil 3 of the electric vehicle 1.

Here, the front wheel is a wheel disposed at the foremost side among the wheels 1a and 1b of the electric vehicle 1, and rear wheel is a wheel disposed at the rearmost side among the wheels 1a and 1b of the electric vehicle 1. Further, the front wheels are provided at both of the left and right sides of the electric vehicle 1 and the rear wheels are also provided at both of the left and right sides of the electric vehicle 1.

The distance data is obtained in advance as described below. A position at which the wheel 1a of the electric vehicle 1 touches the wheel stopper 7, when the electric vehicle enters the stop area S, is designated as a position P1 (see FIGS. 1(A) and 2(A)). The position P1 is a position in the electric vehicle 1. The position P1 is obtained based on a size and a shape of the wheel stopper 7 and a size of the wheel 1a. Data showing the distance L1 in the front-back direction between the position P1 and a center of the power-receiving coil 3 is distance data.

A transmitter 15 is provided in the electric vehicle 1 corresponding to the receiver 9. The transmitter 15 wirelessly transmits the above-mentioned distance data to the receiver 9. The receiver 9 is provided near the approach lane R to the stop area S. The electric vehicle 1 approaches the stop area S through the approach lane R. When the electric vehicle 1 passes through the approach lane R, the transmitter 15 of the electric vehicle 1 automatically transmits the distance data to the receiver 9. Further, a storage device configured to store the above-mentioned distance data is provided in the transmitter 15.

The drive device 11 moves the wheel stopper 7 in the approach direction of the electric vehicle 1 to the stop area S or in an opposite direction of the approach direction.

The controller 13 controls an operation of the drive device 11. The controller 13 makes a distance L2 in the approach direction (see FIGS. 1(A) and 2(A)) between the power-supplying coil 5 and the wheel stopper 7 equal to the distance L1 in the front-back direction shown by the distance data by controlling the drive device 11 based on the distance data.

The controller 13 has a sensor (not shown in the figure) configured to detect the distance L2 in the approach direction between the power-supplying coil 5 and the wheel stopper 7. The distance L2 (referred to as a detected distance) to be detected by the sensor is defined using a position P2 (see FIGS. 1(A) and 2(A)) as described below. The position P2 is a position at which the wheel 1a of the electric vehicle 1 touches the wheel stopper 7 when entering the stop area S. The position P2 is a position in the stop area S (the wheel stopper 7). The position P2 coincides with the position P1 in a state in which the wheel 1a touches and comes in contact with the wheel stopper 7. The distance L2 between the position P2 and a center of the power-supplying coil 5 may be designated as the detected distance. In the first embodiment, since the drive device 11 moves the position P2 of the wheel stopper 7, the position P2 measured in coordinates originating from the center of the power-supplying coil 5 becomes the detected distance L2.

According to the first embodiment, the wheel stopper 7 is fixed to an upper surface of an endless belt 17, and the electric vehicle 1 can run and ride over the upper surface. In the example of FIGS. 1 and 2, the endless belt 17 is spanned between two rollers 19 disposed in the approach direction at an interval. The endless belt 17 and the two rollers 19 between which the endless belt 17 is spanned are paired to form a set, and two sets of the endless belts 17 and the rollers 19 are disposed in the horizontal direction perpendicular to the approach direction at an interval. The power-supplying coil 5 is disposed between the two endless belts 17.

The drive device 11 reciprocates the wheel stopper 7 in the approach direction by rotating the endless belt 17. In the example of FIGS. 1 and 2, the drive device 11 is a motor configured to rotate the roller 19. In each of the above-described sets, one roller 19 is rotated by the drive device 11, and the other roller 19 is freely rotatable.

The drive device 11 synchronously drives the two endless belts 17. In this case, a configuration as described below may be employed. As shown in FIGS. 1 and 2, a shaft 21 configured to coaxially connect the roller 19 disposed at a back side (a left side of FIG. 1) in the approach direction of the one endless belt 17 and the roller 19 disposed at a back side in the approach direction of the other endless belt 17 is provided. In the drive device 11, as the roller 19 disposed at the back side in the approach direction of the one endless belt 17 is rotated, the roller 19 disposed at the back side in the approach direction of the other endless belt 17 is also rotated via the shaft 21.

Figure 3:
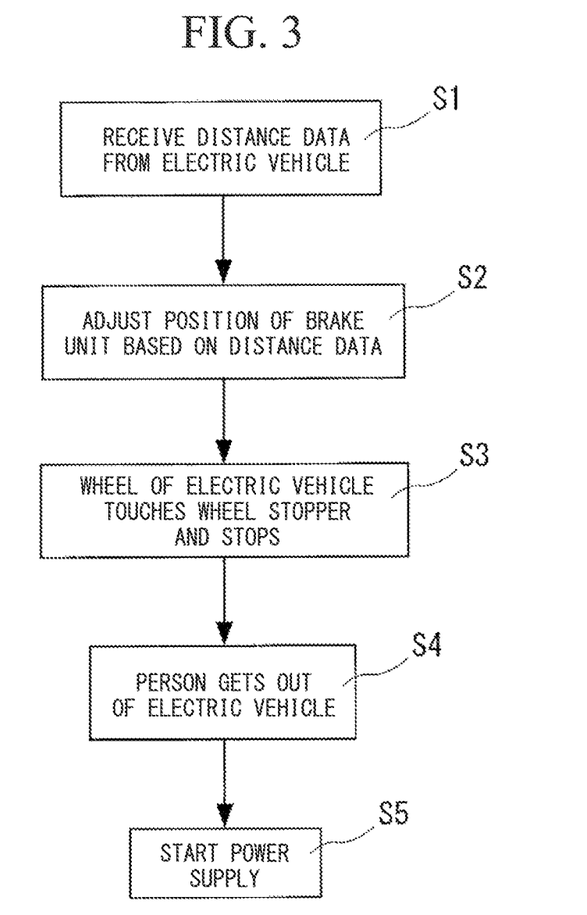
FIG. 3 is a flow chart showing a method of adjusting a relative position between coils according to the first embodiment of the present invention.

FIG. 3 is a flow chart showing a method of adjusting a relative position between coils according to the first embodiment. The method is performed using the above-mentioned device 10 for adjusting the relative position between the coils.

In step S1, the receiver 9 receives the above-mentioned distance data. That is, the receiver 9 receives the distance data showing the distance L1 in the front-back direction between the power-receiving coil 3 and the wheel 1a of the electric vehicle 1 from the transmitter 15 of the electric vehicle 1 that approaches the stop area S. The reception is automatically performed when the electric vehicle 1 passes through the approach lane R.

In step S2, the controller 13 controls the drive device 11 based on the distance data received in step S1. Accordingly, the drive device 11 moves the wheel stopper 7 in the approach direction of the electric vehicle 1 to the stop area S or in an opposite direction of the approach direction. As a result, the distance L2 in the approach direction between the power-supplying coil 5 and the wheel stopper 7 is made equal to the distance L1 in the front-back direction shown by the distance data. Afterward, step S3 is performed.

In step S3, as the electric vehicle 1 runs to enter the stop area S and the wheel 1a touches the wheel stopper 7, the electric vehicle 1 is stopped. In this state, in the approach direction, the position of the power-receiving coil 3 of the electric vehicle 1 coincides with the position of the power-supplying coil 5, and the power-receiving coil 3 and the power-supplying coil 5 are opposite to each other.

Afterward, in step S4, a person gets out of the electric vehicle 1.

Next, in step S5, power supply from the power-supplying coil 5 to the power-receiving coil 3 is started. At this time, the position of the power-receiving coil 3 of the electric vehicle 1 coincides (is aligned) with the position of the power-supplying coil 5. Accordingly, power is efficiently supplied from the power-supplying coil 5 to the power-receiving coil 3.

According to the above-mentioned first embodiment, the following effects can be obtained.

As described below, as the electric vehicle 1 simply touches the wheel stopper 7 and stops, the position of the power-receiving coil 3 and the position of the power-supplying coil 5 can be aligned.

The distance data showing the distance L in the front-back direction between the power-receiving coil 3 and the wheel 1a of the electric vehicle 1 is received by the receiver 9. Based on the distance data, as the controller 13 controls the drive device 1I to move the wheel stopper 7, the distance L2 in the approach direction between the power-supplying coil 5 and the wheel stopper 7 is made equal to the distance L1 in the front-back direction shown by the distance data. Accordingly, in a state in which the wheel 1a of the electric vehicle 1 which entered the stop area S touches the wheel stopper 7 and stops, the position of the power-receiving coil 3 coincides with the position of the power-supplying coil 5 in the approach direction.

In addition, before the electric vehicle 1 enters the stop area S, when the electric vehicle 1 moves in the approach lane R, the distance L2 in the approach direction between the power-supplying coil 5 and the wheel stopper 7 is made equal to the distance L1 in the front-back direction shown by the distance data. Accordingly, the position of the power-supplying coil 5 and the position of the power-receiving coil 3 can be efficiently aligned.

Second Embodiment

In the following description, a device and method of adjusting a relative position between coils according to a second embodiment of the present invention will be described. In the second embodiment, the matters not described below are the same as the first embodiment.

Figure 4:
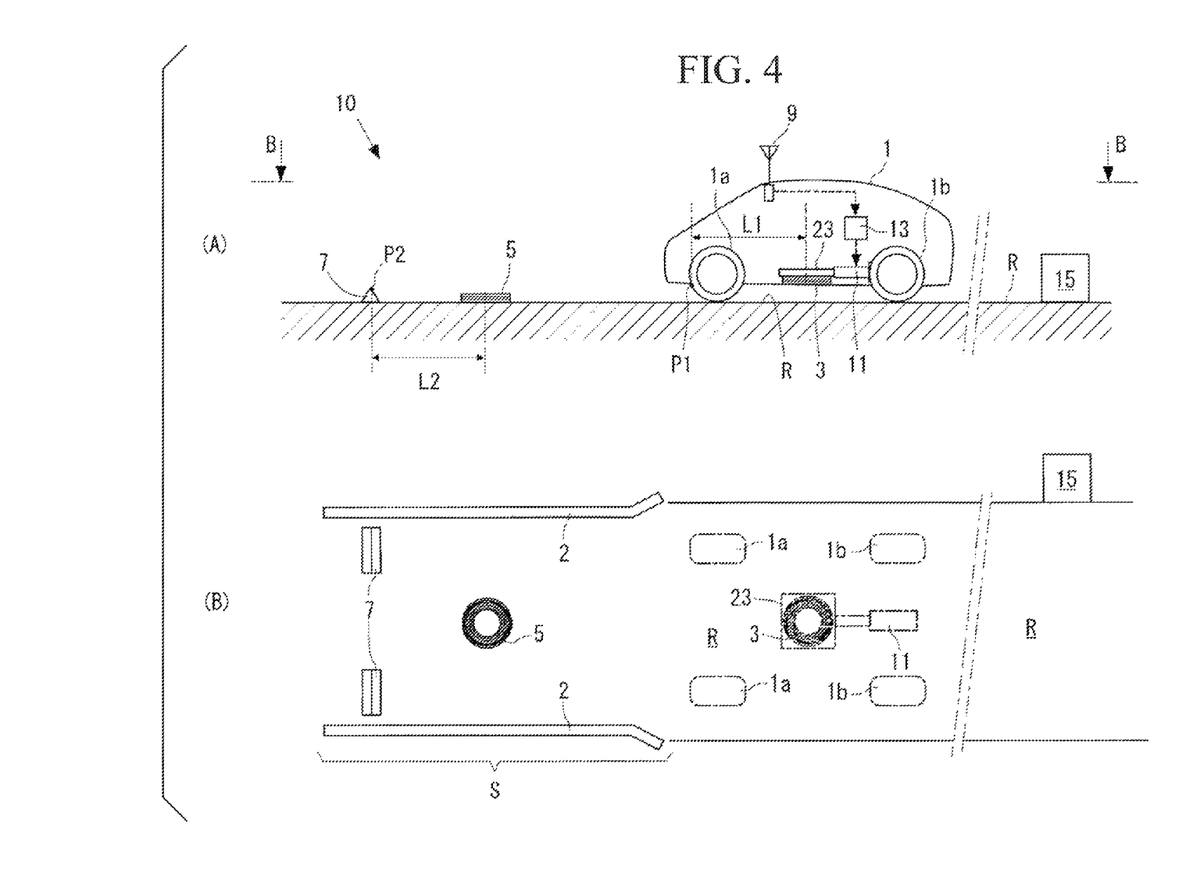
FIG. 4 shows a device for adjusting a relative position between coils according to a second embodiment of the present invention.

FIG. 4 shows a device 10 for adjusting a relative position between coils according to the second embodiment of the present invention. FIG. 4 shows a state in which the electric vehicle 1 is disposed in the approach lane R to the stop area S. FIG. 4(A) is a side view, and FIG. 4(B) is a view taken along line B-B of FIG. 4(A). In FIG. 4(B), of the electric vehicle 1, only the wheels 1a and 1b, the power-receiving coil 3, the drive device 11, and a support 23 (to be described below) are shown by dashed-dotted lines.

The device 10 for adjusting the relative position between the coils adjusts a relative position between the power-receiving coil 3 and the power-supplying coil 5 when electric power is wirelessly supplied from the power-supplying coil 5 to the power-receiving coil 3 of the electric vehicle 1 which has entered into and stopped in the stop area S.

In the stop area S, the power-supplying coil 5 and the wheel stopper 7 are provided. The wheel 1a of the electric vehicle 1 entering the stop area S touches the wheel stopper 7 in the front-back direction of the electric vehicle 1. The power-supplying coil 5 wirelessly supplies electric power to the power-receiving coil 3 of the electric vehicle 1 which has stopped as the wheel 1a touches the wheel stopper 7. Further, the power-receiving coil 3 is disposed near a lower surface of the electric vehicle 1, and an axis thereof is directed in the vertical direction. An axis of the power-supplying coil 5 is directed in the vertical direction.

In the second embodiment, the same wheel guide 2 as in the first embodiment is provided.

The device 10 for adjusting the relative position between the coils is provided with the receiver 9, the drive device 11 and the controller 13. The receiver 9, the drive device 11 and the controller 13 are provided in the electric vehicle 1.

The receiver 9 receives the distance data showing the distance L2 in the approach direction (see FIG. 4(A)) between the wheel stopper 7 and the power-supplying coil 5 from the transmitter 15. Here, the distance L2 in the approach direction means a distance in a direction in which the electric vehicle 1 approaches the stop area S.

The distance data is obtained in advance as described below. A position at which the wheel stopper 7 touches the wheel 1a of the electric vehicle 1 when entering the stop area S is a position P2 (see FIG. 4(A)). The position P2 is a position in the stop area S (the wheel stopper 7). The position P2 is obtained based on the size and the shape of the wheel stopper 7 and the size of the wheel 1a. Data showing the distance L2 in the approach direction between the position P2 and the center of the power-supplying coil 5 is distance data.

The transmitter 15 is provided near the approach lane R disposed in front of the stop area S. The transmitter 15 wirelessly transmits the above-mentioned distance data to the receiver 9. The electric vehicle 1 approaches the stop area S through the approach lane R. When the electric vehicle 1 passes through the approach lane R, the transmitter 15 automatically transmits the distance data to the receiver 9. Further, a storage device in which the above-mentioned distance data are stored is provided in the transmitter 15.

The drive device 11 moves the power-receiving coil 3 of the electric vehicle 1 in the front-back direction. For example, the drive device 11 is a direct motion actuator configured to reciprocate the support 23 to which the power-receiving coil 3 is attached in the front-back direction.

The controller 13 makes the distance L1 in the front-back direction (see FIG. 4(A)) between the power-receiving coil 3 and the wheel 1a equal to the distance L2 in the approach direction shown by the distance data, by controlling the drive device 11 based on the distance data.

The controller 13 has a sensor (not shown in the figure) configured to detect the distance L1 in the front-back direction between the power-receiving coil 3 and the wheel 1a. The distance L1 detected by the sensor (referred to as a detected distance) is defined using the position P1 as described below. The position P1 is a position at which the wheel 1a of the electric vehicle 1 touches the wheel stopper 7 when entering the stop area S. The position P1 is a position in the electric vehicle 1. The position P1 coincides with the position P2 in a state in which the wheel 1a touches and comes in contact with the wheel stopper 7. The distance L1 between the position P and the center of the power-receiving coil 3 is the detected distance. Since the drive device 11 moves the power-receiving coil 3, the position P1 measured in coordinates originating from the center of the power-receiving coil 3 becomes the detected distance L1.

Figure 5:
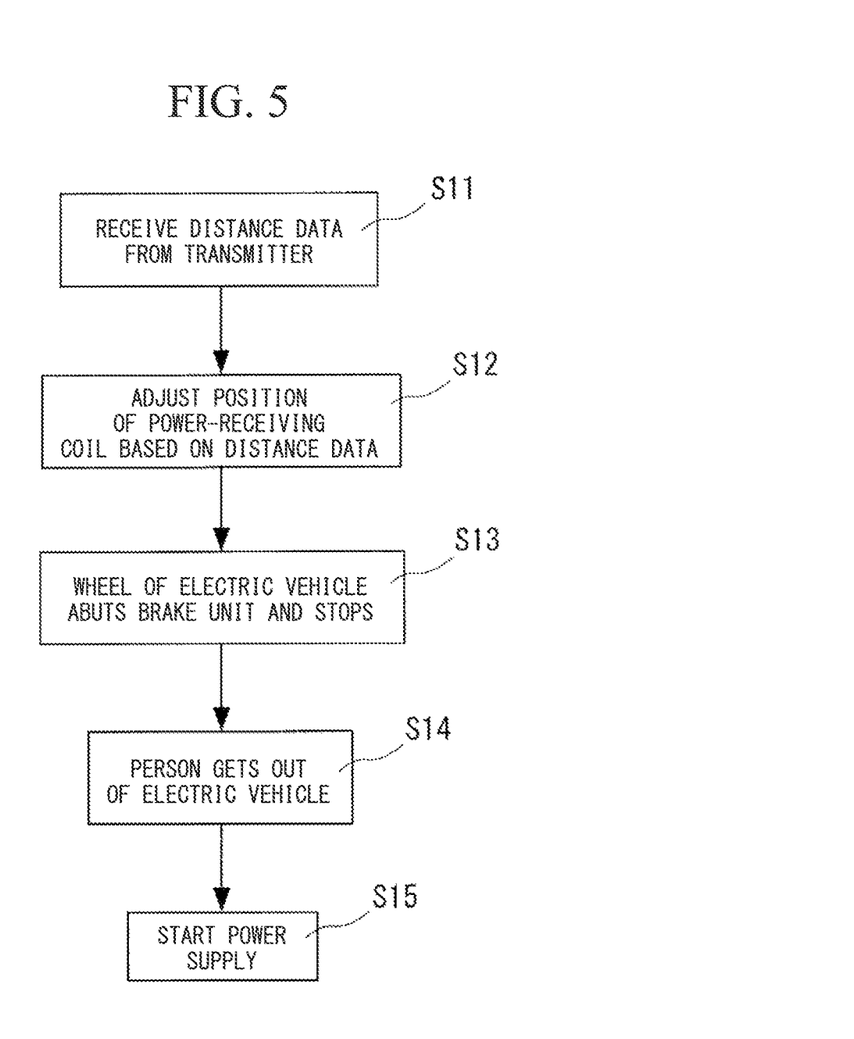
FIG. 5 is a flow chart showing a method of adjusting a relative position between coils according to the second embodiment of the present invention.

FIG. 5 is a flow chart showing a method of adjusting a relative position between coils according to the second embodiment. The method is performed using the above-mentioned device 10 for adjusting the relative position between the coils.

In step S11, the receiver 9 receives the above-mentioned distance data. That is, the receiver 9 receives the distance data showing the distance L2 in the approach direction between the power-supplying coil 5 and the wheel stopper 7 of the stop area S from the transmitter 15 provided near the approach lane R. The reception may be automatically performed when the electric vehicle 1 passes through the approach lane R.

In step S12, the controller 13 controls the drive device 11 based on the distance data received in step S11. Accordingly, the drive device 11 moves the power-receiving coil 3 in the front-back direction. As a result, the distance L1 in the front-back direction between the power-receiving coil 3 and the wheel 1a is made equal to the distance L2 in the approach direction shown by the distance data. After that, step S13 is performed.

In step S13, as the electric vehicle 1 runs to enter the stop area S and the wheel 1a touches the wheel stopper 7, the electric vehicle 1 stops. In this state, in the approach direction, the position of the power-receiving coil 3 of the electric vehicle 1 coincides with the position of the power-supplying coil 5, and the power-receiving coil 3 and the power-supplying coil 5 are opposite to each other.

Afterward, in step S14, a person gets out of the electric vehicle 1.

Next, in step S15, power supply from the power-supplying coil 5 to the power-receiving coil 3 is started. At this time, the position of the power-receiving coil 3 of the electric vehicle 1 coincides (is aligned) with the position of the power-supplying coil 5. Accordingly, power is efficiently supplied from the power-supplying coil 5 to the power-receiving coil 3.

According to the above-mentioned second embodiment, the following effects can be obtained.

As described below, as the wheel 1a of the electric vehicle 1 simply touches the wheel stopper 7 and stops, the position of the power-receiving coil 3 and the position of the power-supplying coil 5 can be aligned.

The distance data showing the distance 12 in the approach direction between the power-supplying coil 5 and the wheel stopper 7 in the stop area S is received by the receiver 9.

Based on the distance data, the controller 13 moves the power-receiving coil 3 by controlling the drive device 11, and thus, the distance L1 in the front-back direction between the power-receiving coil 3 and the wheel 1a is made equal to the distance L2 in the approach direction shown by the distance data. Accordingly, in a state in which the wheel 1a of the electric vehicle 1 which has entered the stop area S touches the wheel stopper 7 and stops, the position of the power-receiving coil 3 coincides with the position of the power-supplying coil 5 in the approach direction.

In addition, before the electric vehicle 1 enters the stop area S, when the electric vehicle 1 moves in the approach lane R, the distance L1 in the front-back direction between the power-receiving coil 3 and the wheel 1a is made equal to the distance L2 in the approach direction shown by the distance data. Accordingly, the position of the power-supplying coil 5 and the position of the power-receiving coil 3 can be efficiently aligned.

The present invention is not limited to the above-mentioned embodiments but various modifications may be made without departing from the gist of the present invention.

For example, with respect to the above-mentioned first embodiment, any one of the following variant examples 1 to 5 may be employed, or the variant examples 1 to 5 may be arbitrarily combined and employed. In this case, the matters not described below may be the same as the above-mentioned first embodiment.

In addition, with respect to the second embodiment, any one of the variant examples 3, 4 and 5 may be employed, or the variant examples 3, 4 and 5 may be arbitrarily combined and employed. In this case, the matters not described below may be the same as the above-mentioned second embodiment.

Variant Example 1

In the first embodiment, the wheel stopper 7 is provided on the endless belt 17, but the present invention is not limited thereto. The drive device 11 may move the wheel stopper 7 using a means other than the endless belt 17 and the roller 19. Such movement is performed in the approach direction of the electric vehicle 1 to the stop area S and in an opposite direction of the approach direction.

Figure 6:
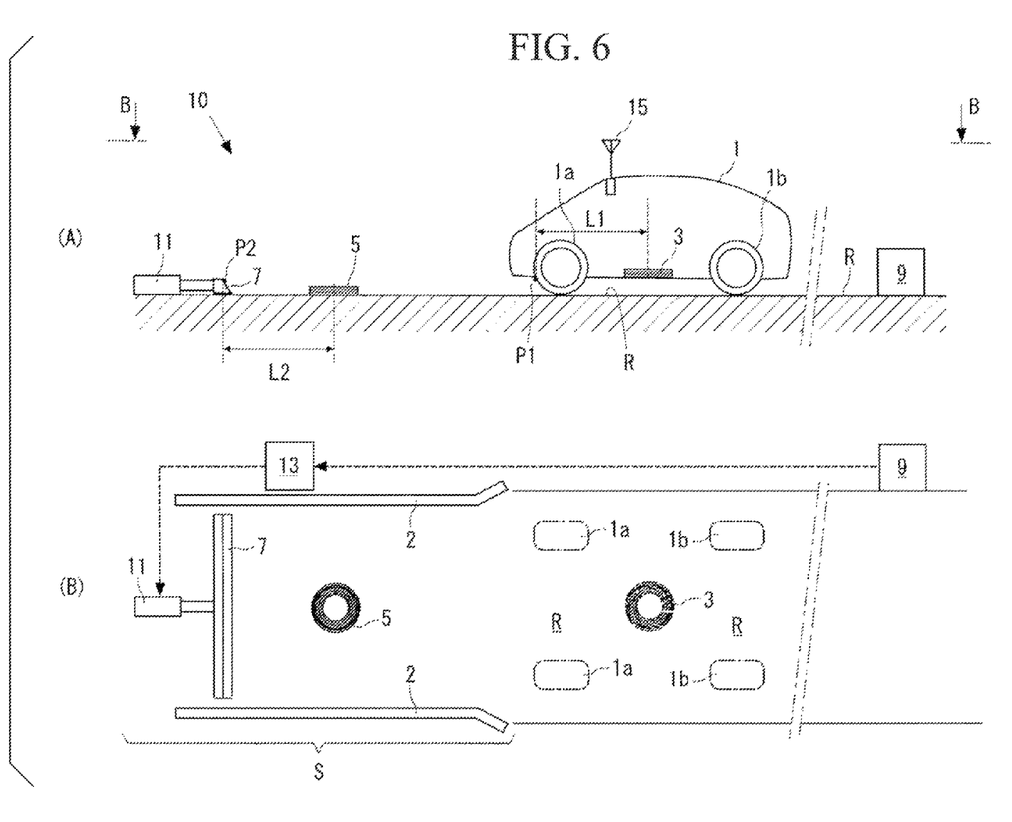
FIG. 6 shows a device for adjusting a relative position between coils according to a variant example 1 of the present invention.

In this case, a configuration of FIG. 6 can be employed. FIG. 6(A) is a side view, and FIG. 6(B) is a view taken along line B-B of FIG. 6(A). In FIG. 6(B), of the electric vehicle 1, only the wheels 1a and 1b and the power-receiving coil 3 are shown by dashed-dotted lines.

In an example of FIG. 6, the drive device 11 is a direct motion actuator configured to move the wheel stopper 7 in the front-back direction but may be constituted of another means.

Variant Example 2

In the above-mentioned first embodiment, the drive device 11 moves the wheel stopper 7, but the present invention is not limited thereto. That is, the drive device 11 may move the power-supplying coil 5 in the approach direction instead of the wheel stopper 7.

Figure 7:
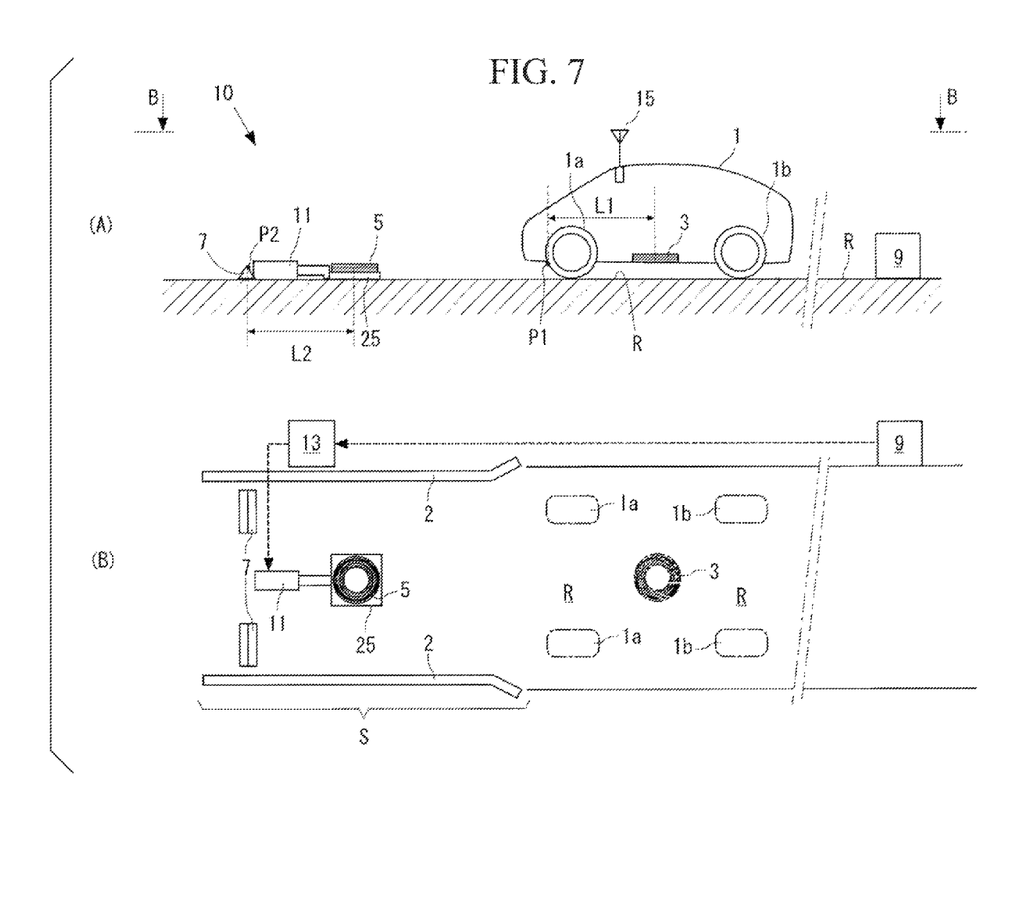
FIG. 7 shows a device for adjusting a relative position between coils according to a variant example 2 of the present invention.

In this case, a configuration of FIG. 7 can be employed. FIG. 7(A) is a side view, and FIG. 7(B) is a view taken along line B-B of FIG. 7(A). In FIG. 7(B), of the electric vehicle 1, only the wheels 1a and 1b and the power-receiving coil 3 are shown by dashed-dotted lines.

In an example of FIG. 7, the drive device 11 is a direct motion actuator configured to move a support 25 configured to support the power-supplying coil 5 in the front-back direction, but the drive device 11 may be constituted of another means.

Accordingly, in the above-mentioned step S2 may be performed as described below. In step S2, the controller 13 controls the drive device 11 based on the distance data received in step S1. Accordingly, the drive device 11 moves the power-supplying coil 5 in the approach direction of the electric vehicle 1 to the stop area S or in an opposite direction of the approach direction. As a result, the distance L2 in the approach direction between the power-supplying coil 5 and the wheel stopper 7 is made equal to the distance L1 in the front-back direction shown by the distance data.

The controller 13 has a sensor (not shown in the figure) configured to detect the distance L2 in the approach direction between the power-supplying coil 5 and the wheel stopper 7. The sensor detects the distance L2, by measuring the center of power-supplying coil 5 in coordinates originating from the above-mentioned position P2 (see FIG. 7(A)).

Variant Example 3

Figure 8:
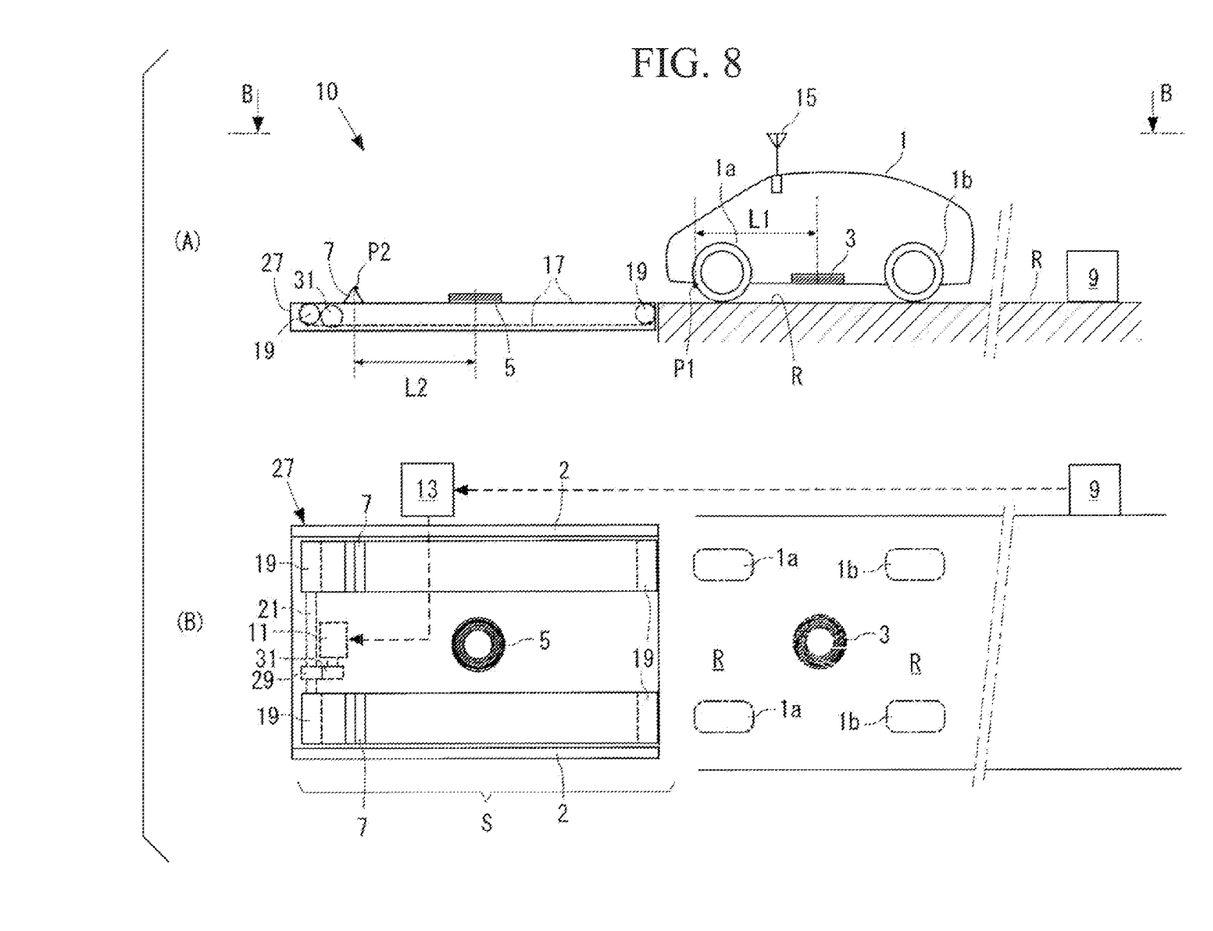
FIG. 8 shows a device for adjusting a relative position between coils according to a variant example 3 of the present invention.

A pallet 27 on which the electric vehicle 1 can ride may be provided in the stop area S. In the first embodiment, the wheel stopper 7, the power-supplying coil 5 and the drive device 11 are provided on the pallet 27. In the second embodiment, the wheel stopper 7 and the power-supplying coil 5 are provided on the pallet 27.

The pallet 27 is moved between the stop area S and a storage space (not shown in the figure) by an appropriate moving means. Such movement may include both of movement from the stop area S to the storage space and movement from the storage space to the stop area S. In addition, such movement is performed in a state in which the electric vehicle 1 rides on the pallet 27.

FIG. 8 shows the case in which the pallet 27 is provided in the first embodiment. FIG. 8(A) is a side view, and FIG. 8(B) is a view taken along line B-B of FIG. 8(A). In FIG. 8(B), of the electric vehicle 1, only the wheels 1a and 1b and the power-receiving coil 3 are shown by dashed-dotted lines. In FIG. 8, the endless belts 17 and the rollers 19 are also provided in the pallet 27.

In the variant example with respect to the first embodiment, for example, after the above-mentioned step S4, the pallet 27 is moved from the stop area S to the storage space. Afterward, step S5 is performed. When step S5 is performed, the pallet 27 is disposed at the storage space.

Similarly, in the variant example with respect to the second embodiment, for example, after the above-mentioned step S14, the pallet 27 is moved from the stop area S to the storage space. Afterward, step S15 is performed. When step S5 is performed, the pallet 27 is disposed in the storage space.

In FIG. 8(A), an upper surface of the endless belt 17 forms a portion of a flat upper surface of the pallet 27. As shown in FIG. 8(B), the wheel guide 2 is provided in the pallet 27. The wheel guide 2 is raised upward from the upper surface of the pallet 27. The wheel guide 2 is not shown in FIG. 8(A). In addition, in FIG. 8, the drive device 11 is a motor configured to rotate a gear 31 meshed with a gear 29 fixed to the shaft 21.

In the variant example, the stop area S may be an entrance space to an automated parking garage. In this case, a toll collecting device may be provided. After the payment of the charge to the toll collecting device, the electric vehicle 1 parked in the above-described automated parking garage can exit.

Variant Example 4

The position of the power-supplying coil 5 or the position of the power-receiving coil 3 may be adjustable in the horizontal direction perpendicular to the approach direction or the front-back direction. For example, when step S4 or step S14 is terminated, electric power is temporarily supplied from the power-supplying coil 5 to the power-receiving coil 3 while varying the position of the power-supplying coil 5 or the position of the power-receiving coil 3 in the horizontal direction perpendicular to the approach direction or the front-back direction. At each position of the power-supplying coil 5 or the power-receiving coil 3, power transmission efficiency is calculated. The power transmission efficiency is a ratio of the power supplied to the power-receiving coil 3 with respect to the power supplied to the power-supplying coil 5. The power supplied to the power-supplying coil 5 and the power supplied to the power-receiving coil 3 are measured by an appropriate means. The power-supplying coil 5 or the power-receiving coil 3 is disposed at a position at which the power transmission efficiency is highest. In this state, step S5 or step S15 is started.

Variant Example 5

In the above-mentioned first embodiment, while step S3 is performed after step S2, a sequence of step S2 and step S3 may be exchanged. That is, after the wheel 1a of the electric vehicle 1 touches the wheel stopper 7 and stops, as the controller 13 controls the drive device 11 based on the distance data received in step S1, the wheel stopper 7 or the power-supplying coil 5 is moved, and the distance L2 in the approach direction between the power-supplying coil 5 and the wheel stopper 7 is made equal to the distance L1 in the front-back direction shown by the distance data. In this case, the receiver 9 may be provided in the stop area S.

Similarly, in the second embodiment, the sequence of step S12 and step S13 may be exchanged. That is, after the wheel 1a of the electric vehicle 1 touches the wheel stopper 7 and stops, as the controller 13 controls the drive device 11 based on the distance data received in step S11, the power-receiving coil 3 is moved and the distance L1 in the front-back direction between the power-receiving coil 3 and the wheel 1a is made equal to the distance L2 in the approach direction shown by the distance data. In this case, the transmitter 15 may be provided in the stop area S.

INDUSTRIAL APPLICABILITY

According to the device and method of the present invention, when electric power is wirelessly supplied from the power-supplying coil to the power-receiving coil of the electric vehicle approached and stopped in the stop area, the position of the power-receiving coil and the position of the power-supplying coil of the electric vehicle can be easily aligned with each other within a short period of time.

The invention claimed is:

1. An adjusting device for adjusting a relative position between a power-supplying coil and a power-receiving coil of an electric vehicle when the electric vehicle has entered and stopped in a stop area for wireless supply of electric power from the power-supplying coil to the power-receiving coil, wherein, the power-supplying coil and a wheel stopper are provided in the stop area, a wheel of the electric vehicle which has entered the stop area touches the wheel stopper, and the power-supplying coil wirelessly supplies power to the power-receiving coil of the electric vehicle stopping as the wheel touches the wheel stopper, the adjusting device comprises:
a receiver configured to receive, from the electric vehicle, distance data showing a distance between the power-receiving coil and the wheel in a front-back direction of the electric vehicle;
a drive device configured to move the wheel stopper or the power-supplying coil in an approach direction of the electric vehicle to the stop area or in an opposite direction of the approach direction; and
a controller configured to control the drive device, and the controller makes a distance in the approach direction between the power-supplying coil and the wheel stopper equal to the distance shown by the distance data by controlling the drive device based on the distance data received by the receiver.

2. The adjusting device for adjusting the relative position between the power-supplying coil and the power-receiving coil of the electric vehicle according to claim 1, wherein a pallet on which the electric vehicle is able to ride is provided in the stop area, and the wheel stopper and the power-supplying coil are provided on the pallet, and the pallet is moved between the stop area and a storage space.

3. An adjusting device for adjusting a relative position between a power-supplying coil and a power-receiving coil of an electric vehicle when the electric vehicle has entered and stopped in a stop area for wireless supply of electric power from the power-supplying coil to the power-receiving coil, wherein, the power-supplying coil and a wheel stopper are provided in the stop area, a wheel of the electric vehicle which has entered the stop area touches the wheel stopper, and the power-supplying coil wirelessly supplies power to the power-receiving coil of the electric vehicle stopping as the wheel touches the wheel stopper, the adjusting device comprises a receiver, a drive device and a controller which are provided in the electric vehicle, the receiver receives distance data showing a distance between the power-supplying coil and the wheel stopper in an approach direction of the electric vehicle from a transmitter, and the transmitter is disposed in front of the stop area or in the stop area, the drive device moves the power-receiving coil of the electric vehicle in a front-back direction of the electric vehicle, and the controller makes a distance in the front-back direction between the power-receiving coil and the wheel equal to the distance shown by the distance data by controlling the drive device based on the distance data received by the receiver.

4. The adjusting device for adjusting the relative position between the power-supplying coil and the power-receiving coil of the electric vehicle according to claim 3, wherein a pallet on which the electric vehicle is able to ride is provided in the stop area, and the wheel stopper and the power-supplying coil are provided on the pallet, and the pallet is moved between the stop area and a storage space.

5. A method of adjusting a relative position between a power-supplying coil and a power-receiving coil of an electric vehicle when the electric vehicle has entered and stopped in a stop area for wireless supply of electric power from the power-supplying coil to the power-receiving coil, the method comprising:

(A) installing the power-supplying coil and a wheel stopper which a wheel of the electric vehicle touches in the stop area;

(B) receiving, from the electric vehicle entering the stop area, distance data showing a distance from the power-receiving coil to the wheel in a front-back direction of the electric vehicle; and (C) making a distance in an approach direction between the power-supplying coil and the wheel stopper equal to the distance shown by the distance data by moving the wheel stopper or the power-supplying coil in the approach direction of the electric vehicle to the stop area or in an opposite direction of the approach direction based on the distance data.

6. The method according to claim 5, wherein, after the (C), the electric vehicle enters the stop area and the electric vehicle stops as the wheel touches the wheel stopper.

7. A method of adjusting a relative position between a power-supplying coil and a power-receiving coil of an electric vehicle when the electric vehicle has entered and stopped in a stop area for wireless supply of electric power from the power-supplying coil to the power-receiving coil, the method comprising:

(A) installing the power-supplying coil, a wheel stopper which a wheel of the electric vehicle touches in the stop area, and a transmitter in front of the stop area or in the stop area;

(B) receiving distance data showing a distance between the power-supplying coil and the wheel stopper in an approach direction of the electric vehicle from the transmitter by a receiver of the electric vehicle; and (C) making a distance in a front-back direction between the power-receiving coil and the wheel equal to the distance shown by the distance data by moving the power-receiving coil in the front-back direction of the electric vehicle based on the distance data.

8. The method according to claim 7, wherein, after the (C), the electric vehicle enters the stop area and the electric vehicle stops as the wheel touches the wheel stopper.

* * * * *